(12) United States Patent
Ryuh et al.

(10) Patent No.: US 9,758,224 B2
(45) Date of Patent: Sep. 12, 2017

(54) DOCKING STATION FOR UNDERWATER ROBOT

(71) Applicant: Korea Institute of Industrial Technology, Cheonan-si, Chungcheongnam-do (KR)

(72) Inventors: Young-Sun Ryuh, Cheonan-si (KR); Wooseok Choi, Cheonan-si (KR); Sanghyo Lee, Cheonan-si (KR); Gi Hun Yang, Cheonan-si (KR); Kyoung Sik Kim, Cheonan-si (KR)

(73) Assignee: HEWLETT-PACKARD INDIGO B.V., Amstelveen (NL)

( * ) Notice: Subject to any disclaimer, the term of this patent is extended or adjusted under 35 U.S.C. 154(b) by 240 days.

(21) Appl. No.: 14/433,949

(22) PCT Filed: Dec. 20, 2012

(86) PCT No.: PCT/KR2012/011188
§ 371 (c)(1),
(2) Date: Apr. 7, 2015

(87) PCT Pub. No.: WO2014/058106
PCT Pub. Date: Apr. 17, 2014

(65) Prior Publication Data
US 2015/0251739 A1    Sep. 10, 2015

(30) Foreign Application Priority Data

Oct. 8, 2012 (KR) .......................... 10-2012-0111392
Nov. 2, 2012 (KR) .......................... 10-2012-0123794

(51) Int. Cl.
*B63G 8/00* (2006.01)
*B25J 11/00* (2006.01)
(Continued)

(52) U.S. Cl.
CPC .............. *B63G 8/001* (2013.01); *B25J 11/00* (2013.01); *B63C 11/52* (2013.01);
(Continued)

(58) Field of Classification Search
CPC ................................................ B63G 2008/008
See application file for complete search history.

(56) References Cited

U.S. PATENT DOCUMENTS 5,253,605 A * 10/1993 Collins ................... B63B 21/66
114/258
8,393,286 B2 * 3/2013 Rooney, III ............ B63B 59/08
114/221 R
(Continued)

FOREIGN PATENT DOCUMENTS

JP    H07-223589    8/1995
JP    2000-1195     1/2000
(Continued)

*Primary Examiner* — Edwin Swinehart
(74) *Attorney, Agent, or Firm* — Saliwanchik, Lloyd & Eisenschenk (57) ABSTRACT

The present disclosure relates to a docking station whereby an underwater robot can be maintained, repaired and managed all the time. According to one aspect of the present disclosure, a docking station can be provided that may comprise: a receiving unit configured to receive an underwater robot therein and positioned under a surface of water; a maintenance unit provided on the receiving unit and positioned above the surface of the water; and a conveyor unit configured to convey the underwater robot from the receiving unit to the maintenance unit.

14 Claims, 7 Drawing Sheets

(51) Int. Cl.
  *B63C 11/52* (2006.01)
  *B63B 27/16* (2006.01)

(52) U.S. Cl.
  CPC .. *B63B 2027/165* (2013.01); *B63G 2008/008* (2013.01); *Y10S 901/01* (2013.01)

(56) References Cited

U.S. PATENT DOCUMENTS

| | | | |
|---|---|---|---|
| 2008/0202405 A1* | 8/2008 | Kern | B63B 23/30 |
| | | | 114/259 |
| 2009/0095209 A1 | 4/2009 | Jamieson | |
| 2014/0224167 A1* | 8/2014 | Gasparoni | B63C 11/52 |
| | | | 114/321 |

FOREIGN PATENT DOCUMENTS

| | | |
|---|---|---|
| JP | 2005-193854 | 7/2005 |
| JP | 2007-001565 | 1/2007 |
| KR | 10-1003967 | 12/2010 |
| KR | 10-2011-0012324 | 2/2011 |
| WO | WO 00/71415 | 11/2000 |
| WO | WO 2009/061562 | 5/2009 |

\* cited by examiner

DOCKING STATION FOR UNDERWATER ROBOT

CROSS REFERENCE TO A RELATED APPLICATION

This application is a National Stage Application of International Application Number PCT/KR2012/011188, filed Dec. 20, 2012; which claims priority to Korean Patent Application Nos. 10-2012-0111392 filed on Oct. 8, 2012 and 10-2012-0123794 filed on Nov. 2, 2012; all of which are incorporated herein by reference in their entirety.

TECHNICAL FIELD

The present disclosure relates to a docking station for maintenance, repair and management of underwater robot.

BACKGROUND OF THE INVENTION

An underwater robot explores underwater environment while moving in the water. Such an underwater robot is capable of moving and exploring in the water by using a power of an embedded battery. If, however, the embedded battery is completely discharged in the water, the underwater robot cannot be operated anymore and the battery needs to be recharged.

Various techniques have been proposed for maintenance, repair and management of the underwater robot such as battery charging. For example, Patent Document 1 (Korean Patent No. 10-10033967) discloses a charging station including a main body at which an underwater exploration robot can dock; and a charging unit configured to charge the underwater exploration robot. Further, as described in Patent Document 2 (Korean Patent Publication No. 2011-0012324), there has been also proposed an underwater robot configured to transmit a charging request packet when the remaining battery or battery status of the underwater robot is below a threshold value, and a charging station configured to locate the underwater robot at a charging position by a magnetic force by way of operating an electromagnet.

In the aforementioned conventional techniques, however, since the charging of the underwater robot is conducted in the water, complete waterproofing for charging is difficult to achieve, and it may result in occurrence of a short circuit.

Accordingly, various kinds of circuits and a battery embedded in the underwater robot are highly likely to be damaged.

Moreover, since the underwater robot is managed only in the water, it has been difficult to dry and clean the underwater robot.

DISCLOSURE

Technical Problem

In view of the foregoing problems, the present disclosure provides a docking station capable of charging an underwater robot safely.

Further, the present disclosure also provides a docking station capable of performing drying and cleaning of the underwater robot smoothly.

In addition, the present disclosure also provides a docking station whereby maintenance, repair and management of the underwater robot can be performed all the time.

Technical Problem

In accordance with an example embodiment of the present disclosure, a docking station may comprise: a receiving unit configured to receive an underwater robot therein and positioned under a surface of water; a maintenance unit provided on the receiving unit and positioned above the surface of the water; and a conveyor unit configured to convey the underwater robot from the receiving unit to the maintenance unit.

Further, the receiving unit may comprise: a guide arm configured to guide a movement of the underwater robot; and a docking unit at which the underwater robot guided from the guide arm is to be settled.

Further, the docking unit may comprise: a sliding portion configured to allow the underwater robot to be slid by gravity and self-weight and settled at a right position; and a driving unit configured to rotate the sliding portion in an upward direction.

Further, the sliding portion may comprise a docking groove extended to have a V-shaped cross section, and the underwater robot may be settled in the docking groove and be slid.

Further, the sliding portion may comprise: a front end portion connected to the driving unit; and a rear end portion configured to be rotated in the upward direction about the front end portion.

Further, the rear end portion may be placed at a position higher than the front end portion by being rotated from a position lower than the front end portion.

Further, the receiving unit may further comprise buoyant bodies that are disposed at both side of the receiving unit and provide buoyance.

Further, the maintenance unit may comprise: a first maintenance unit configured to perform cleaning and drying of the underwater robot; and a second maintenance unit configured to charge a battery of the underwater robot.

Further, the conveyor unit may comprise: a conveyor rail provided at the maintenance unit; a conveyor guide provided to be movable by the conveyor rail; and a gripper connected to the conveyor guide and configured to hold the underwater robot to move the underwater robot.

Further, the gripper may comprise: a first fixing member configured to support one side of the underwater robot; and a second fixing member configured to fix the other side of the underwater robot.

Further, the first fixing member and the second fixing members are provided with a curved portion having a shape corresponding to a contour of the underwater robot.

Further, the curved portion may include a protruding settlement portion for allowing the underwater robot to be stably fixed thereat.

Further, the maintenance unit may comprise at least one of a camera, an antenna and a sensor.

Further, the receiving unit may comprise a movement device configured to move the docking station.

Further, the movement device may include a propeller provided to move the docking station in the water.

Advantageous Effects

With the docking station of the underwater robot according to the example embodiment of the present disclosure, an underwater robot can be charged safely.

Besides, drying and cleaning of the underwater robot can be performed smoothly.

Further, since maintenance, repair and management of the underwater robot can be performed all the time, efficient underwater exploration can be performed.

In addition, by adjusting a sliding position by a self-weight of the underwater robot, the structure of the docking station can be simplified, and economic feasibility can be improved.

BEST MODE FOR THE INVENTION

Hereinafter, example embodiments will be described in detail with reference to the accompanying drawings so that inventive concept may be readily implemented by those skilled in the art.

In discussing the example embodiments, detailed description of known functions or configurations will be omitted when the description disturbs clear understanding of the essentials of the present disclosure.

Figure 1:
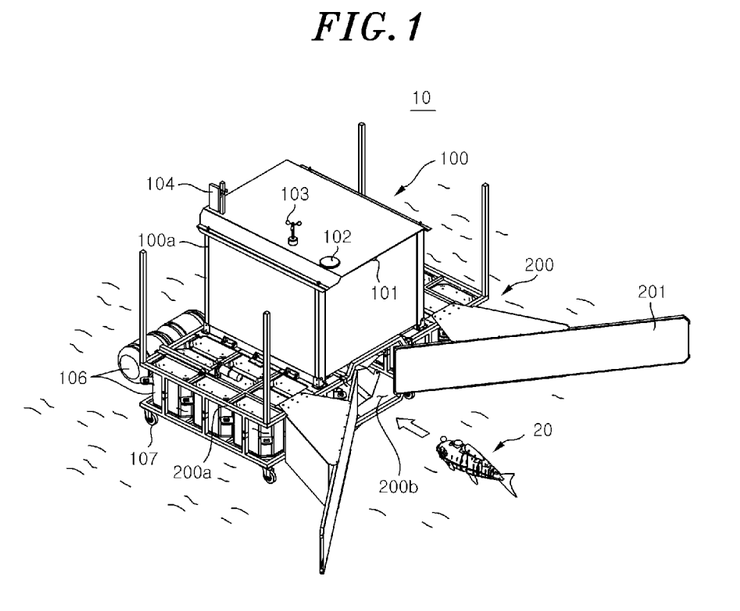
FIG. 1 is a perspective view of a docking station for an underwater robot in accordance with an example embodiment of the present disclosure.
Figure 2:
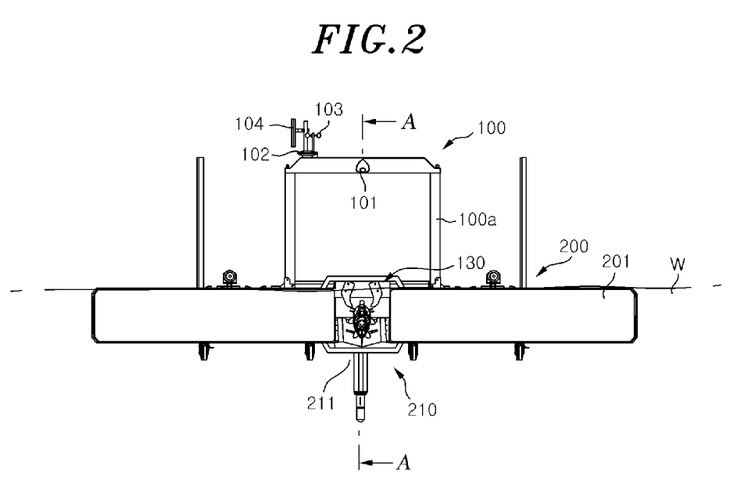
FIG. 2 is a front view of the docking station for the underwater robot in accordance with the example embodiment of the present disclosure.
Figure 3:
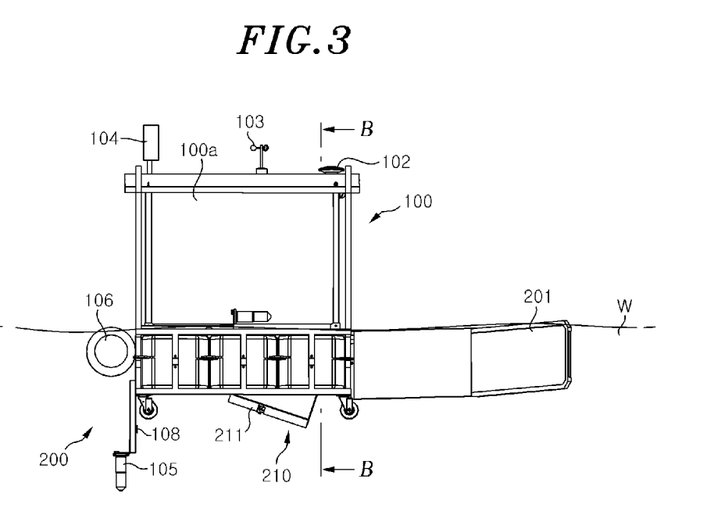
FIG. 3 is a side view of the docking station for the underwater robot in accordance with the example embodiment of the present disclosure.

FIG. 1 is a perspective view of a docking station for an underwater robot in accordance with an example embodiment of the present disclosure. FIG. 2 and FIG. 3 are a front view and a side view of the docking station respectively for the underwater robot in accordance with the example embodiment of the present disclosure.

Referring to FIG. 1 to FIG. 3, a docking station 10 in accordance with the example embodiment includes a receiving unit 200 provided under the surface of water and configured to receive an underwater robot 20 therein; a maintenance unit 100 provided on the receiving unit 200 and located above the surface of the water; and a conveyor unit 130 provided within the maintenance unit 100 and configured to convey the underwater robot 20 from the receiving unit 200 to the maintenance unit 100.

The underwater robot 20 may be formed in a fish shape having a head, a body and a tail. As a whole, the underwater robot 20 is designed to have a streamlined shape, so that water resistance can be minimized.

The receiving unit 200 and the maintenance unit 100 of the docking station 10 are formed to communicate with each other. As the maintenance unit 100 is placed at a top central portion of the receiving unit 200 that is disposed under the surface of the water, the maintenance unit 100 can be located on the surface of the water. In the present example embodiment, placing the maintenance unit 100 on the surface of the water does not mean that an interface between the maintenance unit 100 and the accommodation unit 200 always coincides with the surface of the water. Rather, as a relative concept to the receiving unit 200 disposed under the surface of the water and receiving the underwater robot 20 in the water W, placing the maintenance unit 100 on the surface of the water should be understood to mean that components of the maintenance unit 100 that perform major functions are placed above the surface of the water. For example, a part of the lower portion of the maintenance unit 100 may be submerged in the water.

The receiving unit 200 may include a main body 200a having a rectangular shape, for example; and guide arms 201 configured to guide the underwater robot 20 into the main body 200a.

A buoyant body 106 for providing buoyancy may be disposed at a lateral side of the main body 200a. Here, at least one buoyant body may be provided. Alternatively, the buoyant body 106 may be provided within the main body 200a. That is, the location of the buoyant body 106 does not limit the technical concept of the present disclosure at all.

A movement device 107 may be mounted to a bottom surface of the main body 200a so that the docking station 10 can be moved smoothly on land. In the present example embodiment, the movement device 107 is implemented by casters, but not limited thereto. Further, the main body 200a may be further equipped with a propulsion device (not shown) such as a propeller for adjusting a position of the docking station 10 in the state that the docking station 10 floats in the water.

Further, the movement device 107 may include a position recognition node for position recognition in the water.

The main body 200a is provided with, at a front face thereof, an opening 200b through which the underwater robot 20 can be introduced into the main body 200a. The guide arms 201 may be provided at both sides of the opening 200b.

The size of the guide arms 201 may be determined by reflecting a position recognition error of the underwater robot 20, and the guide arms 201 may be made of a soft material to prevent a damage of the underwater robot 20. The guide arms 201 may be formed so as to be spread from the opening 200b such that the underwater robot 20 can be guided toward the opening 200b when the underwater robot 20 collides with the guide arms 201 on the move to the docking station.

The receiving unit 200 includes a docking unit 210 at which the underwater robot 20 guided by the guide arms 201 can be settled.

The docking unit 210 includes a sliding portion 211 that receives the underwater robot 20 introduced through the opening 200b. The underwater robot 20 can be slid along a docking groove 211c of the sliding portion 211 and moved toward the inside of the main body 200a.

Figure 4:
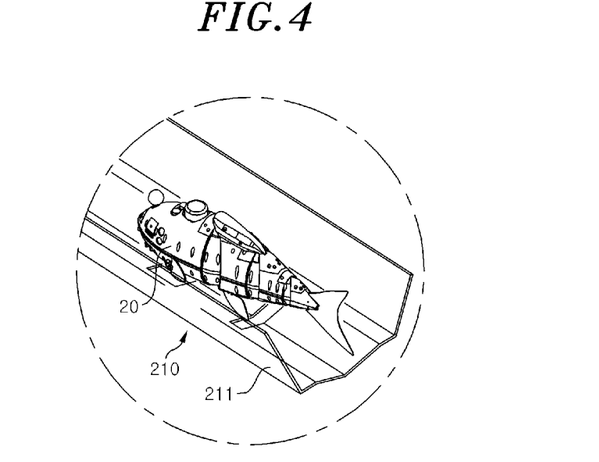
FIG. 4 is a perspective view illustrating a docking groove of a sliding portion of the docking station in accordance with the example embodiment of the present disclosure.
Figure 5:
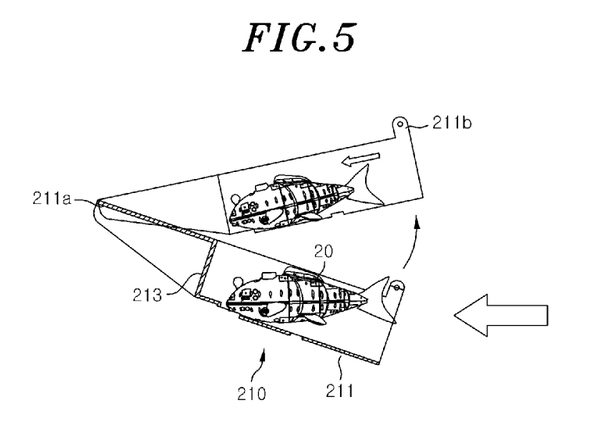
FIG. 5 is a diagram showing a movement of the docking groove of the sliding portion in accordance with the example embodiment of the present disclosure.

FIG. 4 is a perspective view illustrating the docking groove of the sliding portion of the docking station in accordance with the example embodiment of the present disclosure. FIG. 5 is a diagram showing a movement of the docking groove of the sliding portion in accordance with the example embodiment of the present disclosure.

Referring to FIG. 4 and FIG. 5, the sliding portion 211 may have the docking groove 211c extended in a V shape. To elaborate, the docking groove 211c may be formed in a V shape of which center is inclined in a downward direction such that the underwater robot 20 can be located at a right position to be conveyed to the maintenance unit 100 when the underwater robot 20 is slid due to its self-weight.

The underwater robot 20 is moved to the maintenance unit 100 from the receiving unit 200 by the conveyor unit 130 for the purposes of management such as cleaning, drying, charging and overhauling. At this time, the underwater robot 20 needs to be located in the docking groove 211*c* of the sliding portion 211 so as to be stably held by a gripper 133 of the conveyor unit 130.

For this purpose, the docking groove 211*c* is formed to allow the streamlined underwater robot 20 to be aligned in a straight line shape due to gravity and the V-shaped cross sectional structure of the docking groove 211*c*.

To elaborate, if the underwater robot 20 is loaded in the docking groove 211*c* to be aligned for sliding, the sliding portion 211 may be rotated upwards about a front end portion 211*a*.

The receiving unit 200 includes a driving unit 214 configured to rotate the sliding portion 211 upwards.

The driving unit 214 may include a motor having a rotation shaft configured to rotate the front end portion 211*a* to thereby move the sliding portion 211 upwards. In the present example embodiment, the driving unit 214 is implemented by a motor, but not limited thereto. By way of example, the sliding docking groove 211 can be moved upwards by using various devices such as a hinge, a crane, a lifter, or the like.

The driving unit 214 rotates the sliding docking groove 211 in an upward direction of a certain angle θ such that a rear end portion 211*b* of the sliding portion 211 comes to a higher position than the front end portion 211*a*. If the rear end portion 211*b* of the sliding docking groove 211 becomes higher than the front end portion 211*a* thereof, the underwater robot 20 is slid toward the front end portion 211*a* of the sliding portion 211 due to its self-weight. At this time, since the docking groove 211*c* of the sliding portion 211 is formed to have the V-shaped cross section and the underwater robot 20 is formed to have the streamlined body with an oval cross section, the posture of the underwater robot 20 can be aligned in an extending direction of the V-shaped groove. The sliding docking groove 211 may be provided with a stopper 213 that stops the movement of the underwater robot 20 if the underwater robot 20 is slid to a preset position, whereby the underwater robot 20 can be held in a right place.

Thus, an additional mechanism for the alignment of the underwater robot 20 is not required, so that the structure of the docking station can be simplified.

Further, the maintenance unit 100 includes a case 100*a* which is disposed on the receiving unit 200, forming an outer body. Further, the maintenance unit 100 also includes a CCD camera 101, a GPS 102, a meteorological station 103, a wireless antenna 104, and so forth that are mounted to the exterior side of the case 100*a*.

The CCD camera 101, the GPS 102, the meteorological station 103 and the wireless antenna 104 may be disposed on a top end of the case 100*a*, but not limited thereto.

The GPS 102 recognizes the position of the underwater robot 20. That is, the GPS 102 is capable of performing position recognition of the underwater robot over a wide range in association with a corresponding operation function of the docking station 10 itself.

The meteorological station 103 is configured to monitor a weather condition such as a wind direction or a temperature and transmit the weather condition information to the underwater robot 20 submerged in the water.

Further, the receiving unit 200 may be equipped with a position tracking system (Ultra Short Base Line, USBL) communication module 105, a water quality measurement sensor 108, and so forth.

By providing the water quality measurement sensor 108 in the docking station 10, the docking station 10 may be utilized as a floating water quality monitoring system.

Figure 6:
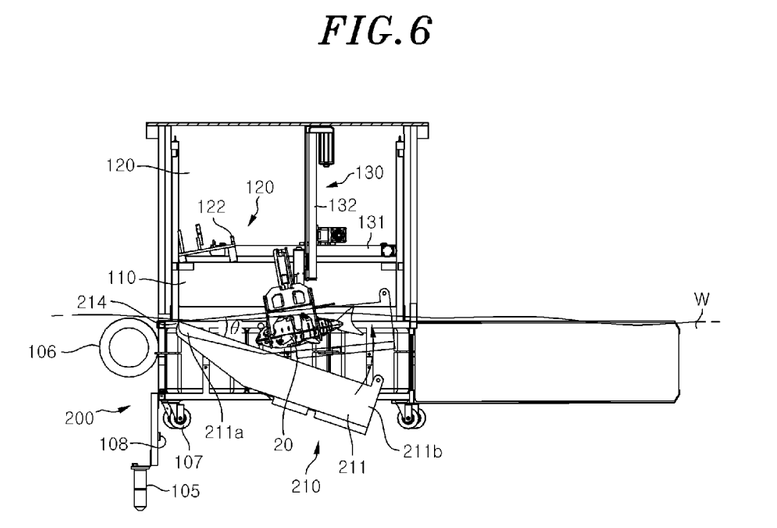
FIG. 6 is a cross sectional view illustrating a conveyor unit of the docking station in accordance with the example embodiment of the present disclosure.
Figure 7:
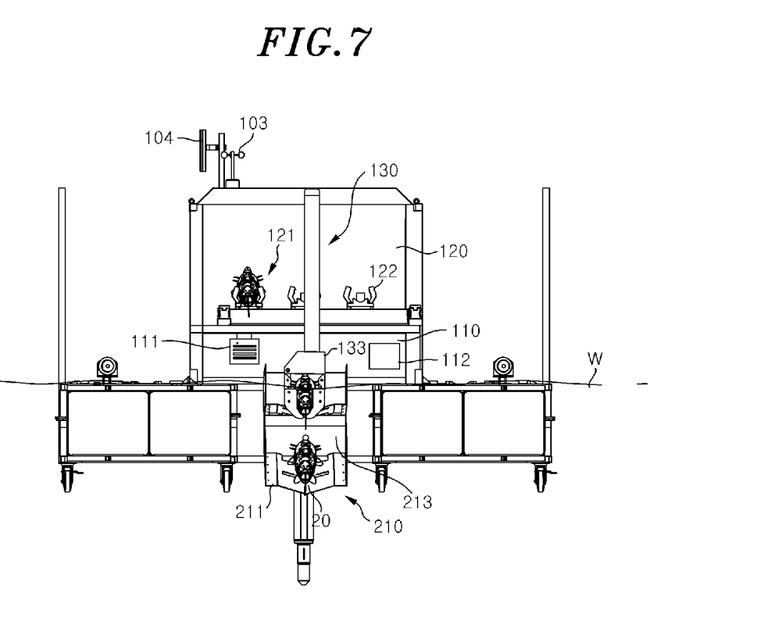
FIG. 7 is a cross sectional view illustrating a maintenance unit of the docking station in accordance with the example embodiment of the present disclosure.
Figure 8:
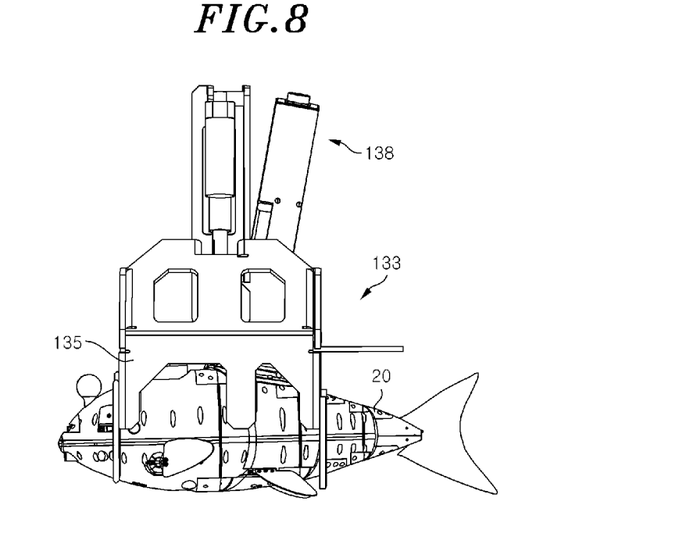
FIG. 8 and FIG. 9 are perspective views illustrating a gripper of the docking station in accordance with the example embodiment of the present disclosure.

FIG. 6 is a cross sectional view illustrating the conveyor unit of the docking station according to the example embodiment of the present disclosure, and FIG. 7 is a cross sectional view illustrating the maintenance unit of the docking station according to the example embodiment of the present disclosure. FIG. 8 is a perspective view showing a gripper of the docking station according to the example embodiment of the present disclosure.

Referring to FIG. 6 to FIG. 8, the maintenance unit 100 includes a first maintenance unit 110 provided within the case 100*a* and a second maintenance unit 120 disposed on the first maintenance unit 110.

The first maintenance unit 110 includes a cleaning device 112 for eliminating impurities adhering to the exterior surface of the underwater robot 20; and a drying device 11 for drying moisture clinging to the exterior surface of the underwater robot 20.

The cleaning device 112 includes a water-jet hose for cleaning the underwater robot 20, or the like. The drying device 111 includes a blower configured to blow heated air to the underwater robot 20, or the like. In the present example embodiment, the cleaning device 112 and the drying device 111 are described to include the water-jet hose and the blower, respectively, the present disclosure may not be limited thereto.

The second maintenance unit 120 includes a charging unit 121 configured to charge the battery of the underwater robot 20.

The charging unit 121 may include at least one protruding charging terminal 122.

In the present example embodiment, the maintenance unit 100 is described to be have a two-story structure as the second maintenance unit 120 is provided on top of the first maintenance unit 110. However, the example embodiment is not limited thereto, and the first maintenance unit 110 and the second maintenance unit 120 may be arranged horizontally.

Referring to FIG. 7, the maintenance unit 100 will be elaborated in further details. When the underwater robot 20 is conveyed from the docking groove 211*c* of the sliding portion 211 of the receiving unit 200, impurities adhering to the underwater robot 20 during the underwater exploration are eliminated by the cleaning device 112 of the first maintenance unit 110. Then, upon the completion of the cleaning process, the cleaned underwater robot 20 is moved to and dried by the drying device 111.

Upon the completion of the cleaning and drying process, the underwater robot 20 is moved to a charging position in the second maintenance unit 120 and charged by being connected to the charging terminal 122.

The conveyor unit 130 for conveying the underwater robot 20 from the receiving unit 200 to the maintenance unit 100 includes a conveyor rail 131 provided within the case 100*a* of the maintenance unit 100; a conveyor guide 132 movably mounted to the conveyor rail 131; and a gripper 133 connected to an end portion of the conveyor guide 132 and configured to move the underwater robot 20.

The conveyor rail 131 may be mounted on an inner top surface or an inner side surface of the case 100a. By way of example, the conveyor guide 132 may be provided to move the conveyor guide 132 in an X-axis direction (left-right direction of FIG. 7) and a Y-axis direction (paper plane direction of FIG. 7).

The conveyor guide 132 is configured to be movable in the X-axis direction and in the Y-axis direction along the conveyor rail 131. The gripper 133 can be moved in a vertical direction (Z-axis direction) along the conveyor guide 132, and the conveyor guide 132 may be equipped with driving devices such as a motor and a belt for moving the gripper 133 in the vertical direction.

The aforementioned arrangement of the conveyor rail 131 and the conveyor guide 132 is nothing more than an example, and the present disclosure is not limited thereto. The conveyor rail 131 and the conveyor guide 132 only need to have a structure and a configuration capable of conveying the gripper 133 in an internal space of the maintenance unit 100 in three axial directions. For this purpose, various known devices can be used as the conveyor rail 131 and the conveyor guide 132.

Figure 9:
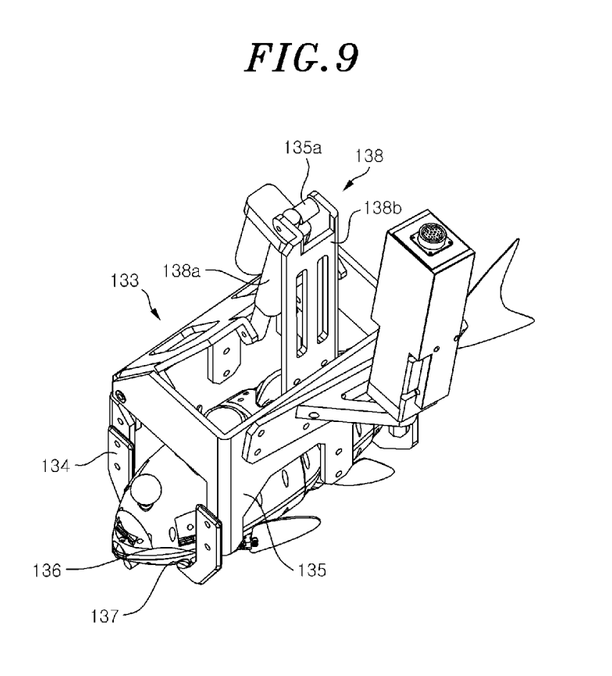

The gripper 133 includes a first fixing member 134 configured to support one side of the underwater robot 20 located in the docking groove 211c of the sliding portion 211; and a second fixing member 135 configured to fix the other side of the underwater robot 20.

The first fixing member 134 and the second fixing member 135 are connected to the conveyor guide 132 via a gripper arm 138. The gripper arm 138 includes a first gripper arm 138a connected to the first fixing member 134 and a second gripper arm 138b connected to the second fixing member 135.

The gripper 133 is configured to hold or unhold the underwater robot 20 by adjusting a distance between the first fixing member 134 and the second fixing member 135.

The second gripper arm 138b of the second fixing member 135 is rotatably coupled to the first gripper arm 138a by a hinge 135a. The second gripper arm 138b can be moved from the first fixing member 134 by being rotated about the hinge 135a, so that the distance between the first and second fixing members can be adjusted.

Each of the first fixing member 134 and the second fixing member 135 is provided with a curved portion 136 conforming to the streamlined contour of the underwater robot 20. Further, a protruding settlement portion 137 for stably fixing the underwater robot 20 is provided at an end of each curved portion 136.

The curved portions 136 of the first and second fixing members 134 and 135 may be arranged to face each other.

With this configuration, if one side of the underwater robot 20 is supported at the curved portion 136 of the first fixing member 134, the second fixing member 135 is rotated about the hinge 135a, supporting and fixing the other side of the underwater robot 20.

Figure 10:
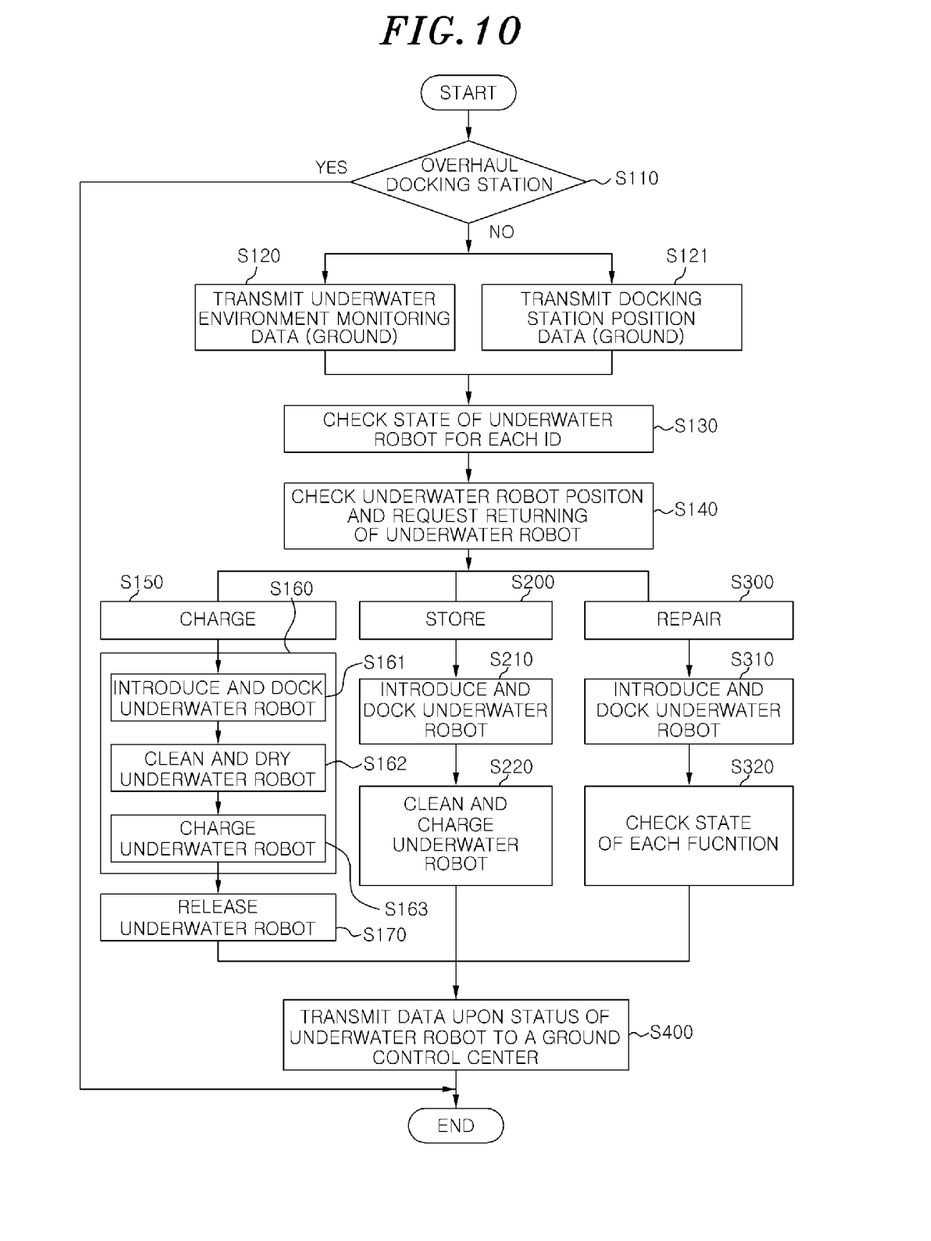
FIG. 10 is a flowchart for describing an operation method for the docking station in accordance with the example embodiment of the present disclosure.

FIG. 10 is a flowchart for describing an operation method for the docking station in accordance with the example embodiment.

Now, a process of the docking station 10 for operating the underwater robot 20 having the above-described configuration according to the example embodiment all the time will be described.

The underwater robot 20 explores underwater environment, and the docking station 10 transmits data upon the status and the position of the underwater robot 20 and monitors data acquired by the underwater robot 20 (S120 and S121).

At this time, the docking station 10 checks a state of the underwater robot 20 for each ID (S130), and checks the position of the underwater robot 20 and requests the returning of the underwater robot 20 (S140).

If the underwater robot 20 accesses the docking station 10 for charging (S150), storage (S200) or repair (S300), the underwater robot 20 docks into the docking station 10 (S161, S210 and S310).

At this time, the underwater robot 20 can be introduced to the docking unit 210 within the receiving unit 200 by being guided by the guide arm 201.

After the underwater robot 20 is introduced to the docking unit 210, the sliding portion 211 is rotated in an upward direction of a preset angle θ such that the rear end portion 211b of the sliding portion 211 comes to a position higher than the front end portion 211a thereof. If the rear end portion 211b of the sliding portion 211 becomes higher than the front end portion 211a, the underwater robot 20 is slid toward the front end portion 211a of the docking groove 211c of the sliding portion 211 due to its self-weight and the V-shaped cross section, and settled there.

The underwater robot 20 settled at the sliding docking groove 211 of the docking unit 210 is conveyed by the conveyor unit 130. Then, cleaning and drying of the underwater robot 20 are performed by the cleaning device 112 and the drying device 111 in the first maintenance unit 110 of the maintenance unit 100 placed above the surface of the water (S162 and S220). Then, the underwater robot 20 is moved into the second maintenance unit 120 and the battery thereof is charged therein (S163 and S220).

Then, the completely charged underwater robot 20 is released through the receiving unit 200 by the conveyor unit 130 (S170).

Upon the completion of the repair (S300) of the underwater robot 20, the underwater robot 20 is released after a state of each function of the underwater robot 20 is investigated (S320).

Data may be sent to the ground so that a user can monitor occurrence of abnormality regarding the introduction of the underwater robot 20 into the docking station 10 and the cleaning, drying, charging and releasing of the underwater robot 20 (S400).

Further, weather condition such as a wind direction or a temperature, or a water quality can be monitored by using the USBL communication module 105, the wireless antenna 104, the GPS 102, the CCD camera 101, the water quality sensor 108, and the like provided in the maintenance unit 100.

Further, by enabling communication relay between the underwater and the ground, the docking station 10 may have a function as a gateway.

In addition, it may be possible to recognize the position of the underwater robot 20 over a wide range by using a movement operation function of the docking station 10 itself in association with GPS position recognition.

Accordingly, by sending various weather condition information and underwater information to the underwater robot 20, the underwater robot 20 can be operated safely with improved efficiency.

In the docking station 10 according to the example embodiment of the present disclosure, since the receiving unit 200 for receiving the underwater robot 20 is located under the surface of the water and the maintenance unit 100 for the management of the underwater robot 20 is positioned above the surface of the water, the docking station 10 can be operated all the time, so that efficient underwater exploration is enabled.

Furthermore, the entire structure for setting the underwater robot 20 at the docking station 10 can be simplified, so that the structure of the docking station 10 can also be simplified.

Although example embodiments of the present disclosure are described above with reference to the accompanying drawings, those skilled in the art will understand that the present disclosure may be implemented in various ways without changing the necessary features or the spirit of the present disclosure. Therefore, it should be understood that the example embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

The invention claimed is:

1. A docking station, comprising:
   a receiving unit configured to receive an underwater robot therein and positioned under a surface of water;
   a maintenance unit provided on the receiving unit and positioned above the surface of the water; and
   a conveyor unit configured to convey the underwater robot from the receiving unit to the maintenance unit, wherein the conveyor unit comprises:
   a conveyor rail provided at the maintenance unit;
   a conveyor guide provided to be movable by the conveyor rail; and
   a griper connected to the conveyor guide and configured to hold the underwater robot to move the underwater robot.

2. The docking station of claim 1, wherein the receiving unit comprises:
   a guide arm configured to guide a movement of the underwater robot; and
   a docking unit at which the underwater robot guided from the guide arm is to be settled.

3. The docking station of claim 2, wherein the docking unit comprises:
   a sliding portion configured to allow the underwater robot to be slid by gravity and self-weight and settled at a right position; and
   a driving unit configured to rotate the sliding portion in an upward direction.

4. The docking station of claim 3, wherein the sliding portion comprises a docking groove extended to have a V-shaped cross section, and the underwater robot is settled in the docking groove and is slid.

5. The docking station of claim 3, wherein the sliding portion comprises:
   a front end portion connected to the driving unit; and
   a rear end portion configured to be rotated in the upward direction about the front end portion.

6. The docking station of claim 5, wherein the rear end portion is placed at a position higher than the front end portion by being rotated from a position lower than the front end portion.

7. The docking station of claim 1, wherein the receiving unit further comprises buoyant bodies that are disposed at both side of the receiving unit and provide buoyance.

8. The docking station of claim 1, wherein the maintenance unit comprises:
   a first maintenance unit configured to perform cleaning and drying of the underwater robot; and
   a second maintenance unit configured to charge a battery of the underwater robot.

9. The docking station of claim 1, wherein the gripper comprises:
   a first fixing member configured to support one side of the underwater robot; and
   a second fixing member configured to fix the other side of the underwater robot.

10. The docking station of claim 9, wherein the first fixing member and the second fixing members are provided with a curved portion having a shape corresponding to a contour of the underwater robot.

11. The docking station of claim 10, wherein the curved portion includes a protruding settlement portion for allowing the underwater robot to be stably fixed thereat.

12. The docking station of claim 1, wherein the maintenance unit comprises at least one of a camera, an antenna and a sensor.

13. The docking station of claim 1, wherein the receiving unit comprises a movement device configured to move the docking station.

14. The docking station of claim 13, wherein the movement device includes a propeller provided to move the docking station in the water.

* * * * *

UNITED STATES PATENT AND TRADEMARK OFFICE
CERTIFICATE OF CORRECTION

PATENT NO. : 9,758,224 B2  
APPLICATION NO. : 14/433949  
DATED : September 12, 2017  
INVENTOR(S) : Young-Sun Ryuh et al.

Page 1 of 1

It is certified that error appears in the above-identified patent and that said Letters Patent is hereby corrected as shown below:

On the Title Page

Item (73) "Assignee: Hewlett-Packard Indigo B.V., Amstelveen (NL)" should read --Assignee: Korea Institute of Industrial Technology, Cheonan-si, Chungcheongnam-do (KR)--.

Signed and Sealed this  
Eighteenth Day of June, 2019

Andrei Iancu  
*Director of the United States Patent and Trademark Office*